A

United States Patent [19]

Hooykaas et al.

[11] Patent Number: 5,347,077
[45] Date of Patent: Sep. 13, 1994

[54] TOXIC WASTE FIXANT AND METHOD FOR USING SAME

[75] Inventors: Carel W. J. Hooykaas, Rotterdam, Netherlands; Jeffrey P. Newton, Wichita, Kans.

[73] Assignee: Pelt & Hooykaas B.V., Rotterdam, Netherlands

[21] Appl. No.: 955,296

[22] Filed: Oct. 1, 1992

[30] Foreign Application Priority Data

Oct. 1, 1991 [NL] Netherlands ............ 9101656

[51] Int. Cl.$^5$ .............. B09B 3/00; C04B 18/04
[52] U.S. Cl. ................... 588/257; 106/733; 405/266; 588/252
[58] Field of Search ............ 588/252, 256, 257; 405/128, 129, 263, 266; 106/287.18, 287.19, 733, 745, 769

[56] References Cited

U.S. PATENT DOCUMENTS 4,142,912 3/1979 Young ................... 588/252
4,209,335 6/1980 Katayama et al. .

FOREIGN PATENT DOCUMENTS 0283600 9/1988 European Pat. Off. .

OTHER PUBLICATIONS

Chemical Abstract vol. 102, No. 10, abstract No. 83429v.

*Primary Examiner*—David H. Corbin
*Attorney, Agent, or Firm*—Levine & Mandelbaum

[57] ABSTRACT

A toxic waste fixant for detoxification of a contaminated soil, sediment, and or sludge material includes a mixture of: ferric and/or ferrous sulfate, manganese sulfate, and/or aluminium sulfate and/or Portland cement, and/or gypsum (calcium sulfate), and/or blast furnace slag, and/or lime (calcium oxide). Fixants made from mixtures of the above compounds are designed to prevent leaching in excess of regulatory standards for specified inorganic and organic toxic compounds and elements. These fixants will also reduce the concentration of most organic toxic compounds through various chemical reactions and bonding as determined by solvent extractions and analysis by GC/MS. The ferric and/or ferrous sulfate may be partially or completely replaced by cobalt sulfate, whereas instead of the respective sulfates the corresponding chlorides may be used as well.

17 Claims, No Drawings

TOXIC WASTE FIXANT AND METHOD FOR USING SAME

BACKGROUND OF THE INVENTION

This invention relates to the field of toxic waste treatment, and, more particularly to a toxic waste fixant for preventing the leaching of organic and inorganic toxics at unacceptable levels of leaching from soils, sediments, and sludges and cause a significant reduction in the inherent toxicity concentration of a contaminated material by chemical bonding and reaction as well as a method for using that fixant.

The problem of the safe disposal of toxic waste materials is a pressing one. With the ever increasing generation of hazardous materials in our industrial society, there is a growing demand for strict controls of the handling and disposal of all forms of toxic waste. In response to that demand, legislatures, both state and federal, have passed laws limiting the amount and nature of wastes which may be discharged into the environment. There has been a great deal of movement of late to make these laws more stringent, and reaching the goals set forth in the laws may soon become much more difficult.

Toxic wastes are legally defined in the various statutes and regulations dealing with their handling and treatment, but they may be broadly defined as any material generated as a by-product of an industrial process capable of having an adverse impact upon the environment if discharged without treatment.

The statutes and regulations also set forth the standards to be met by the industry which generates the waste, generally by setting maximum limits of a specified number of parts-per-million (ppm), parts per billion (ppb), or parts per trillion (ppt) of the free waste found in the test samples, as measured relative to a leaching test standard. It is thus the goal of toxic waste treatment processes to reduce the levels of the waste present and or leaching in an excessive degree in the test samples to the lowest levels possible, at least to a level below the mandated maximum.

Known methods of treating toxic wastes, in terms of stabilization/solidification or chemical fixation methods, include, for example the five broad categories of: sorption, lime-fly-ash pozzolan process, pozzolan-Portland cement systems, thermoplastic microencapsulation, and macroencapsulation.

Sorption involves adding a solid to material containing the waste to be treated. The solid soaks up any liquid present, and may produce a soil-like material containing the waste, and is most suitable for applications involving the treatment of non-reactive, non-biodegradable wastes. Typical solids suitable for use in sorption include activated carbon, anhydrous sodium silicate, various forms of gypsum, celite, clays, expanded mica, zeolites, coal fly ash, cement kiln dust, and lime.

Lime-fly-ash pozzolanic processes utilize a finely divided, non-crystalline silica in fly ash, and the calcium in the lime to produce a low-strength cementation. The treated wastes are entrapped within the pozzolan concrete matrix (micro-encapsulation), thereby removing them from contact with the environment.

Pozzolan-Portland systems use Portland cement and fly ash, or other pozzolan materials to produce a stronger type of waste/concrete composite. Waste containment results from microencapsulation of the waste in the concrete matrix. Soluble silicates may be added to accelerate hardening and metal containment.

Thermoplastic microencapsulation involves blending fine particulate waste with melted asphalt or other matrix. Liquid and volatile phases associated with the wastes are isolated in a mass of cooled, hardened, asphalt. The resultant material can be buried without a container.

Microencapsulation systems contain waste by isolating large masses of the waste using some form of jacketing material. The most carefully researched systems use a 208-drum or polyethylene jacket fused over a monolithic block of solidified wastes.

These systems are useful, and appropriate for many applications, but they are not suitable for meeting all current state and federal laws and for all types of materials. There still exists a need for a better system for treating toxic wastes to prevent the leaching of impermissible levels of those wastes into the environment.

There thus exists a need for a new material which can be used in certain applications for the disposal or containment of some forms of toxic wastes to a greater degree than heretofore known.

OBJECTS AND SUMMARY OF THE INVENTION

Accordingly, it is an object of the invention to provide a toxic waste fixant which overcomes the drawbacks of the prior art. It is a further object of the invention to provide a toxic waste fixant which renders toxic wastes non-leachable to a greater degree than known methods.

It is a still further object of the invention to provide a toxic waste fixant with an improved microstructure in the presence of high concentrations of acid, leaching solvents, salt water or other conditions which may impair the leaching resistance of the fixant.

Briefly stated, there is provided a toxic waste fixant for detoxification of a contaminated materials. The fixant includes at least a mixture of an iron (II) and/or iron (III) salt and a manganese salt.

According to a special embodiment the iron salt(s) present can be replaced partially or completely by a cobalt salt. Cobalt ions are more reactive than iron ions; cobalt is nevertheless more expensive.

The salt(s) used are preferably the sulfate or chloride; although it will be obvious that other anions having an equivalent action can also be used.

The fixant according to the invention comprises from about 2,5 to about 10% b.w. iron and/or cobalt salt and from about 2,5 to about 10% b.w. manganese salt.

Besides the combination of metal salts, the present fixant preferably also comprises an inorganic hydraulic binding agent. Said binding agent may be present in an amount of up to 90%, especially 80–88% b.w. of the fixant. Although the binding agent can, for example, consist of Portland cement, any other hydraulic cement can be used as well.

Further, the present fixant preferably comprises an aluminium salt, especially aluminium sulfate or chloride, expediently in an amount of 2–5% b.w. of the fixant.

To control the setting time of the binding agent it is preferred to add gypsum (calcium sulfate), expediently in an amount of up to 6 to 10%.

As mentioned before, other hydraulic binding agents, to obtain a hard, rocklike endproduct, can be used as well. In this respect, preference is given to an inorganic hydraulic binding agent based on slag material, especially chosen from the group comprising ground or not-ground, granulated blast furnace slags; fine or ground blast furnace slags; fine or ground steel slags; porous granulated steelslag, etc. The amount of slag material present in the fixant according to the invention ranges expediently from 20 to 80%, preferably from 27 to 75%.

Said inorganic hydraulic binding agent further preferably consists of a calcium comprising cement, which means a cement comprising calcium oxide, especially unhydrated lime. Said cement is then preferably mixed with an alumino silicate, such as fly ash. The cement of unhydrated lime may amount up to 70% based on the fixant.

According to a special embodiment the present fixant further comprises trimercapto-S-triazine trisodium salt to fix heavy metals, the amount thereof depending upon the concentration of the heavy metals in the mixture to be treated with the present fixant.

The present invention further relates to a process for rendering harmless material being polluted with toxic waste, wherein said material is mixed with an aqueous suspension of a fixant according to the invention, and the resultant mix is set to a hard, rock-like product by adding an inorganic hydraulic binding agent and if needed water.

The aqueous suspension to be used preferably has a ratio of water to fixant of 0.6 to 1.2 parts by weight of said fixant.

The invention thus provides a fixant for treating toxic waste including a mixture of a cement, ferric sulfate, manganese sulfate, and aluminium sulfate; in respective amounts of from about eighty to about eighty-eight weight percent hydraulic cement; from about five to ten percent of ferric sulfate; from about five to about ten weight percent manganese sulfate; and from about two to five weight percent of aluminium sulfate.

As a variation of the invention, there is provided a fixant for treating toxic wastes comprising; a cement, of from fifty percent to about sixty-two percent of the weight of said fixant, blast furnace slag, of from about twenty seven percent to about thirty nine percent of the weight said fixant, gypsum, of from about six percent to about twelve percent of the weight of said fixant, ferric sulfate, of from two to about five percent of the weight of said fixant, and manganese sulfate, of from two to about five percent of said fixant. According to this embodiment of the invention, there is thus provided a fixant for chemical and physical bonding of toxic wastes, said fixant comprising a mixture of: a cement, blast furnace slag, gypsum, ferric sulfate, manganese sulfate, and aluminium sulfate.

As a variation of the invention, there is provided that the fixant may substitute blast furnace slag, and or calcium oxide (unhydrated lime), for the cement portion of the invention. In orther words, the fixant may only be composed of blast furnace slag and/or unhydrated lime and six to ten percent by weight of gypsum, two to five percent by weight of ferric sulfate and manganese sulfate.

According to a further feature of the invention, there is provided a method of treating a material containing a toxic waste, comprising the steps of: mixing a fixant, said fixant including a ferric sulfate, manganese sulfate, and/or aluminium sulfate, and/or cement, and/or slag, and/or gypsum, and/or lime, adding said fixant to said material, whereby said fixant cures in said material, and renders said toxic waste substantially less leaching after treatment.

The above, and other objects, features and advantages of the present invention will become apparent from the following description.

DETAILED DESCRIPTION OF THE PREFERRED EMBODIMENT

The invention is directed to the manufacture and use of a fixant for treating toxic wastes found in a soil, sediment, or sludge material. In the following description of the preferred embodiment of the invention, the material is a soil containing the toxic waste, but this is not intended to be limitative, merely illustrative.

The efficacy of the treatment of soils containing toxic wastes is measured by the fractional portion of the soil, sediment, and or sludge consisting of the toxic components, in parts per million (ppm) or parts per billion (ppb) as appropriate versus the amount of such inorganic and organic toxic components capable of leaching from the contaminated soil by the prescribed leach and extraction tests.

It has been determined that a mixture of cement, and/or slag, and/or gypsum, and/or lime, and/or ferric sulfate, and/or manganese sulfate, and/or aluminium sulfate, presents much improved efficacy in the treatment of inorganic and organic toxic wastes, such as lead, mercury, arsenic, chromium, cyanide, copper, polychlorinated biphenyls, benzene, toluene, xylenes, naphtalene, anthracene, and other polynuclear aromatic compounds. This listing does not exclude other organic and inorganic compounds and elements.

The mechanism of the reaction is not yet fully understood; it nevertheless has been observed and is disclosed herein to provide as much insight as possible into the mechanisms of the treatment activity afforded by the fixant. The composition and activity of the invention are described in detail.

The fixant effects chemical change in the structure of toxic by for example ionic exchange, substitution reactions, intermolecular forces (dipole-dipole, hydrogen bonds, London forces, bimolecular displacement, and various organo-metallic bonding of the toxic components in the contaminated material. These changes convert the toxic waste into innocuous compounds and complexes thereby lowering the overall levels of free toxic components remaining in the material after treatment. The fixant binds the toxic constituents into a hardening concrete matrix.

The cement used may be a standard commercial cement, readily available to the public. Similarly, blast furnace slag, gypsum, and lime are commonly available articles of commerce. Their combination, per se, has been performed many times in the previous art, for treating toxic wastes, such as in the described sorption and pozzolan-Portland cement systems. However, the addition of ferric sulfate, manganese sulfate, and aluminium sulfate in the present invention is the unique aspect of this fixant and the fact that the objective is to pass the prescribed leach and extraction tests.

The microstructure of materials treated with the fixant exhibit increased durability, compared to known systems, in the presence of high acidity (down to pH 0.5), in various leaching solvents, salt water, or other conditions in which it would normally be impaired.

Furthermore, the fixant is relatively inexpensive, so it may compare favorably to other, less desirable, alternatives, such as incineration or confinement to toxic waste dumps.

Treating a material containing a toxic waste with the fixant produces a substance having a complex crystalline, i.e. four or more connective network, inorganic polymer. The resultant macromolecules comprise selected polyvalent inorganic elements that react in a polyfunctional manner, and produce branched and cross-linked polymers having a density sufficient to cause some IPN (Interpenetrating Polymer network) bonding. The resultant polymers also have a high resistance to acids or other naturally occurring deteriorates. Structural bonding in the polymer is primarily ionic and covalent. There is a two-phase reaction in which the toxic components are complexed first in a rapid reaction, and then permanently complexed further in the building of macromolecules which continue to generate over a long period of time.

The first phase of the fixation generates irreversible colloidal structures, complexes through ion exchanges and covalent bonding with toxic metals and organics by means of the mentioned added metals, ferric sulfate, manganese sulfate, and aluminium sulfate. In a high percentage of reactions with halogenated hydrocarbons, a bimolecular displacement or substitution occurs as the first step in the linking mechanism to the second phase macromolecules.

In the second phase, the generation of the macromolecule framework, also involves a relatively irreversible colloid synthesis. This a slower reaction, however, going from sol to gel, and finally to a crystalline, three-dimensional, inorganic polymer. The treated material should be able to pass currently proposed leaching standards within from 7 to 28 days. Of particular importance in the bonding of the hazardous elements and compounds is the development of the second phase reaction of sulpho-ferri-aluminate hydrates. The bonding characteristics and structural durability are varied to accommodate a particular application by varying the composition of the fixant.

Specific examples will illustrate the efficacy of the fixant in the illustrative applications.

EXAMPLE I

| Fixant Composition by Weight: | |
|---|---|
| Portland Cement | 88% |
| Manganese Sulfate | 5% |
| Ferric Sulfate | 5% |
| Aluminium sulfate | 2% |

The following is a summary of leach testing on soil contaminated with moderate levels of organic toxic compounds that also contained high levels of long chain background hydrocarbons. The above listed fixant composition was used at 20% by weight to the weight of soil. Values in ppm are shown below. These are 14 day cure values. The Total Organic Carbon is 1.5%. The unconfined compressive strength at 28 days was 600 psi and at 45 days 1000 psi.

| Compound | Untreated Concentration | Leach Value | Treated Leach |
|---|---|---|---|
| benzene | 768 | 7 | 0.023 |
| toluene | 180 | | 0.89 |
| xylenes | 51 | | 0.62 |
| naphtalene | 1838 | | 2.90 |
| phenanthrene | 648 | | 0.11 |
| fluorene | 347 | | 0.05 |
| fluoranthene | 451 | | 0.03 |
| pyrene | 408 | | 0.08 |
| chrysene | 252 | | 0.05 |
| anthracene | 318 | | 0.08 |

EXAMPLE II

| Fixant Composition by Weight: | |
|---|---|
| Portland Cement | 62% |
| Manganese Sulfate | 2,5% |
| Ferric Sulfate | 2,5% |
| Blast Furnace Slag | 27% |
| Gypsum | 6% |

The following treatment tests were performed on soil samples containing toxic metals using the above given fixant composition.

I. TEST ONE

Total Concentrations—Arsenic 43,000 ppm, Mercury 5,300 ppm TCLP values after seven days of sample treated at 30% by weight with the fixant was the following. As 3.5 ppm and Hg 0.06 ppm.

II. TEST TWO

Chromium +6 and Cyanide

The following was obtained from a treatment with the fixant compared to treatment only by Portland Cement. Total Chromium 6310 ppm, Total cyanide 235 ppm Untreated Leachate, Cr=37 ppm, CN=0,34 ppm

| % Treatment to/ weight of soil | Cement Cr | Treatment CN | Fixant Cr | Treatment CN |
|---|---|---|---|---|
| 15% | 5.25 ppm | 0.86 ppm | 0.29 ppm | <0.02 ppm |
| 35% | 3.93 ppm | | BD | BD |

BD = Below Detection

III. TEST THREE

Chromium +6

Waste lagoons contaminated with chromium +6 at 7155 ppm. Cr+6 leached at 150 ppm. Treatment was at 25% by weight with the fixant. The leach data from a one day cure was Cr+6 non-detectable and total chromium leached at 0.15 ppm.

IV. TEST FOUR

Arsenic, Lead, Copper

A soil sample was contaminated with arsenic 2200 ppm, lead-670 ppm, chromium-1250 ppm, and copper at 3000 ppm. Treated at 15% by weight with the fixant the EP Toxicity leach values after one a week cure were arsenic-0.126 ppm, lead-non-detectable, chromium-1.1 ppm, and copper 0.22 ppm.

V. TEST FIVE

The soil sample of test four was further contaminated with cadmium-670 ppm and mercury-2100 ppm. Treatment with the above fixant composition in the presence of trimercapto-S-triazine trisodium salt resulted in non-detectable leach values for the metals present.

EXAMPLE III

| Fixant composition: | |
|---|---|
| Portland Cement | 90% |
| Manganese Sulfate | 5% |
| Ferric Sulfate | 5% |

Aniline is considered to be a difficult compound for chemical fixation to control in terms of leaching and is also extremely toxic. The above described fixant was tested against fourteen other products and mix designs in this treatability study. The objective was to treat the aniline contaminated lime/soil (pH 12.5) material so that the TCLP value was less than 50 ppb. This was a trial for using metal cluster catalysis using ferric sulfate and manganese sulfate to achieve a fixation, bonding, or complexion of organic toxic compounds. In this case a bimetallic cluster catalyst was used and the following was the result. Also of interest in this case, none of the organophilic formulations used performed satisfactorily.

| Total Aniline (ppm) | Percent treatment by weight | Untreated TCLP (ppm) | Treated TCLP (ppb) |
|---|---|---|---|
| 146 (10 day cure) | 20 | 7.1 | N.D. < 1 |
| 325 (10 day cure) | 20 | 12.5 | 110 |
| 325 (10 day Cure) | 30 | 12.5 | N.D. < 1 |
| 325 (30 day cure) | 20 | 12.5 | N.D. < 1 |
| cement (32 days) | 30 | 12.5 | 100 |

Cement leach values continued to increase over time. FTIR studies were done on the aniline plus cement and aniline treated by the above described fixant.

These results supported the premise that there is significant chemical bonding by a different and shifted chemical activity spectra of the fixant and the toxic constituent, particularly in the characteristic absorption bands associated with the aniline molecule as compared to the cement plus aniline.

The above examples show the remarkable results achieved by the use of the fixant.

Having described preferred embodiments of the invention, it is to be understood that the invention is not limited to those precise embodiments, and that various changes and modifications may be effected therein by one skilled in the art without departing from the scope or spirit of the invention as defined in the appended claims. Such a modification being for example the use of metal chlorides instead of the metal sulfates, and the replacement of the iron compound by a cobalt compound. In this respect it is yet remarked that the cobalt compound is more reactive than the iron compound; it is nevertheless also more expensive so that in an economical view the use of the iron compounds will be preferred.

What is claimed is:

1. A fixant for fixing toxic waste material consisting of mixed inorganic and organic toxic compounds, said fixant consisting of an inorganic hydraulic binding agent and a mixture of an iron salt and a manganese salt, wherein said salts react with the toxic compounds at ambient temperature to obtain a metal compound or cluster, and wherein said salts are selected from the group consisting of sulfate and chloride.

2. A fixant according to claim 1, wherein said iron salt is at least partially replaced by a cobalt salt.

3. A fixant according to claim 1, wherein said fixant comprises from 2.5 to 10 percent by weight of iron and/or cobalt salt and from 2.5 to 10 percent by weight of manganese salt.

4. A fixant according to claim 1, wherein said fixant further comprises an inorganic hydraulic binding agent.

5. A fixant according to claim 4, wherein said fixant comprises up to 90 percent inorganic hydraulic binding agent.

6. A fixant according to claim 1, wherein said fixant further comprises an aluminum salt.

7. A fixant according to claim 6, wherein said aluminum salt is in the amount of up to 5 percent of said fixant by weight.

8. A fixant according to claim 1 further comprising calcium sulfate.

9. A fixant according to claim 4, wherein said inorganic hydraulic binding agent comprises ground or not ground, granulated blast furnace slags; fine or ground blast furnace slags; fine or ground steelslags; or porous granulated steelslags.

10. A fixant according to claim 9, wherein said slags are in the amount of 20–80% of said fixant by weight.

11. A fixant according to claim 9, wherein said inorganic hydraulic binding agent further comprises calcium oxide.

12. A fixant according to claim 11, wherein up to 70 percent calciumoxide, based on said fixant is present.

13. A fixant according to claim 1, further comprising an agent for fixing heavy metals.

14. A process for rendering harmless a material being polluted with toxic waste, comprising the steps of mixing said material with an aqueous suspension of a fixant for fixing said toxic waste and hardening the obtained mixture by the addition of an inorganic hydraulic binding agent and water, wherein said fixant comprises at least a mixture of an iron salt and a manganese salt.

15. A process according to claim 14, wherein said aqueous suspension has a ratio of water to fixant of 0.6 to 1.2 parts by weight of said fixant.

16. A process according to claim 14, wherein said fixant further comprises an aluminum salt.

17. A process according to claim 14, wherein said iron salt is at least partially replaced by a cobalt salt.

* * * * *